US008906239B2

(12) United States Patent
Dai et al.

(10) Patent No.: US 8,906,239 B2
(45) Date of Patent: Dec. 9, 2014

(54) USE OF SILICON-CONTAINING POLYMERS TO IMPROVE RED MUD FLOCCULATION IN THE BAYER PROCESS

(75) Inventors: Qi Dai, Stamford, CT (US); Donald Paul Spitzer, Stamford, CT (US); Howard I. Heitner, Tuckahoe, NY (US); Huann-Lin Tony Chen, Darien, CT (US)

(73) Assignee: Cytec Technology Corp., Wilmington, DE (US)

( * ) Notice: Subject to any disclaimer, the term of this patent is extended or adjusted under 35 U.S.C. 154(b) by 34 days.

(21) Appl. No.: 13/363,712

(22) Filed: Feb. 1, 2012

(65) Prior Publication Data

US 2012/0125862 A1 May 24, 2012

Related U.S. Application Data

(62) Division of application No. 12/052,415, filed on Mar. 20, 2008.

(60) Provisional application No. 60/912,981, filed on Apr. 20, 2007.

(51) Int. Cl.
*C02F 1/52* (2006.01)
*C01F 7/06* (2006.01)
*B03D 3/06* (2006.01)
*C02F 1/54* (2006.01)

(52) U.S. Cl.
CPC ............... *C01F 7/0653* (2013.01); *B03D 3/06* (2013.01); *C02F 1/545* (2013.01); *C02F 1/52* (2013.01)
USPC ............................ 210/723; 210/728; 210/724

(58) Field of Classification Search
CPC .................................. C02F 1/52; C02F 1/545
USPC ......................................................... 210/723
See application file for complete search history.

(56) References Cited

U.S. PATENT DOCUMENTS

| | | | |
|---|---|---|---|
| 3,390,959 A | 7/1968 | Sibert | |
| 3,681,012 A | 8/1972 | Sibert | |
| 3,779,912 A | 12/1973 | Redmore et al. | |
| 4,083,925 A | 4/1978 | Green et al. | |
| 4,678,585 A | 7/1987 | Brownrigg | |
| 4,767,540 A | 8/1988 | Spitzer et al. | |
| 5,476,522 A | 12/1995 | Kerr et al. | |
| 5,516,435 A | 5/1996 | Lewellyn | |
| 5,534,235 A | 7/1996 | Reed et al. | |
| 5,539,046 A | 7/1996 | Lewellyn | |
| 5,560,832 A | 10/1996 | Sivakumar et al. | |
| 5,597,475 A | 1/1997 | Kerr | |
| 5,601,726 A | 2/1997 | Cole | |
| 5,679,261 A | 10/1997 | Sivakumar et al. | |
| 6,036,869 A | 3/2000 | Selvarajan et al. | |
| 6,200,377 B1 | 3/2001 | Basilio et al. | |
| 6,527,959 B1 | 3/2003 | Quadir et al. | |
| 6,605,674 B1 | 8/2003 | Whipple et al. | |
| 6,814,873 B2 | 11/2004 | Spitzer et al. | |
| 7,390,415 B2 | 6/2008 | Spitzer et al. | |
| 2004/0162406 A1 | 8/2004 | Spitzer et al. | |
| 2005/0010008 A2 | 1/2005 | Spitzer et al. | |
| 2005/0133460 A1* | 6/2005 | McClung | 210/759 |
| 2005/0274926 A1 | 12/2005 | Spitzer et al. | |

FOREIGN PATENT DOCUMENTS

WO    2004009606    1/2004

* cited by examiner

*Primary Examiner* — Tony G Soohoo
*Assistant Examiner* — Peter Keyworth
(74) *Attorney, Agent, or Firm* — David P. LeCroy

(57) ABSTRACT

The suspended solids content of a Bayer process stream is reduced by contacting the stream with silicon-containing polymers.

14 Claims, No Drawings

USE OF SILICON-CONTAINING POLYMERS TO IMPROVE RED MUD FLOCCULATION IN THE BAYER PROCESS

CROSS-REFERENCE TO RELATED APPLICATIONS

This application is a divisional application of, and claims priority to, U.S. patent application Ser. No. 12/052,415 filed on Mar. 20, 2008, which claims benefit of priority to U.S. Provisional Application No. 60/912,981, filed Apr. 20, 2007. The contents of both U.S. patent application Ser. Nos. 12/052,415 and 60/912,981 are incorporated herein by reference in their entirety.

FIELD OF THE INVENTION

This invention relates to the removal of suspended solids from Bayer alumina process streams by contacting the streams with Si-containing polymers.

BACKGROUND

Bauxite is the basic raw material for almost all manufactured alumina compounds. In the course of production of aluminum compounds, most bauxite is refined to aluminum hydroxide by the Bayer process. The Bayer process involves hot leaching of bauxite with NaOH solution in pressure vessels to obtain supersaturated sodium aluminate solutions from which $Al(OH)_3$ is precipitated by seeding. Bayer process refineries share six common process stages: bauxite mining; raw material preparation; bauxite digestion; separation, washing, disposal of insoluble bauxite residue; aluminum hydroxide (trihydrate) precipitation; and calcinations to anhydrous alumina. The process of separating bauxite residue solids from the supersaturated green liquor near its boiling point is known as "clarification".

In the clarification stage, the coarser solid particles are generally removed with a "sand trap" cyclone. To separate the finer solid particles from the liquor, the slurry is normally fed to the center well of a mud settler where it is treated with a flocculant composition that may be based on a variety of flocculating agents including starch, flour, polyacrylate salt polymer, acrylate salt/acrylamide copolymer, and/or water-soluble polymers containing pendant hydroxamic acid or salt groups. As the mud settles, clarified sodium aluminate solution, referred to as green liquor, overflows a weir at the top of the mud settling tank and is passed to the subsequent process steps. The sodium aluminate solution is generally cooled to enhance supersaturation and then seeded, e.g. with fine gibbsite seed from previous cycles to initiate precipitation of the desired end product $Al(OH)_3$.

The settled solids from the flocculation procedure, known as red mud, are withdrawn from the bottom of the mud settler and passed through a countercurrent washing circuit for recovery of sodium aluminate and soda. Aluminate liquor overflowing the settler may still contain significant amounts of suspended solids. This liquor is generally further clarified by filtration to give a filtrate that contains a very low level of suspended solids. Depending on the level of silicates in the bauxite, the red mud and/or aluminate liquor may contain sodium aluminosilicates. Dissolved sodium aluminosilicates may precipitate to form scale. Insoluble sodium aluminosilicates, also known as desilication product (DSP), may remain suspended in the red mud and/or aluminate liquor.

Alumina in relatively pure form is precipitated from the filtrate as alumina trihydrate crystals. The remaining liquid phase is returned to the initial digestion step and, after being reconstituted with additional caustic, is employed as a digestant of additional ore.

The suspended solids are preferably separated at a relatively fast rate if the overall Bayer process is to be efficient. Efficient removal of suspended solids from Bayer process streams has been a major challenge for many years. Among the methods of speeding up separation of suspended solids from process streams as well as providing a cleaner separation of the constituents are those disclosed in U.S. Pat. No. 3,390,959, which employs polyacrylates as flocculants, and U.S. Pat. No. 3,681,012, which uses combinations of polyacrylates and starch in Bayer alumina recovery circuits. U.S. Pat. No. 4,083,925 discloses the use of polyacrylamide within the mud settler. U.S. Pat. No. 4,678,585 teaches that different stages in the Bayer alumina recovery circuit are advantageously treated with different flocculant compositions. U.S. Pat. No. 4,767,540 describes a process for removing suspended solids from Bayer alumina process streams by contacting and mixing a Bayer process stream with hydroxamated polymers. The hydroxamated polymers may be employed with anionic polyacrylate. U.S. Pat. Nos. 5,516,435 and 5,539,046 use blends of hydroxamated polymer emulsions with polyacrylate emulsions to remove suspended solids from Bayer alumina process streams. Other polymers disclosed for the treatment of red mud in the Bayer process include phosphonic acid-containing polymers (U.S. Pat. No. 5,534,235), water continuous methyl acrylate emulsion polymers (U.S. Pat. No. 6,036,869), and salicylic acid containing polymers (U.S. Pat. No. 6,527,959).

Silicon-containing polymers have been disclosed for water clarification. For instance, U.S. Pat. No. 3,779,912 uses silicon-containing aminomethylphosphonates to flocculate suspended solids in water. Copolymers of diallydimethylammonium halide and a vinyltrialkoxysilane are disclosed as a coagulant used in demulsification of oily waste waters (U.S. Pat. No. 5,560,832), dewatering of mineral slurries (U.S. Pat. No. 5,597,475), and clarification of waste waters (U.S. Pat. No. 5,679,261). U.S. Pat. No. 6,605,674 discloses the use of vinyltrialkoxysilanes as cross-linking agents to modify structure of nonionic, cationic and anionic water-soluble polymers and the use of the structurally-modified polymers as flocculating agents. None of the above-mentioned silicon-containing polymer patents relate to the treatment of suspended solids from the Bayer process streams.

The use of silicon-containing polymers to control aluminosilicate scale has been disclosed, see U.S. Pat. No. 6,814,873 and U.S. Pat. Pub. Nos. 2004/0162406 A1, 2005/0010008 A2, and 2005/0274926 A2. These publications describe methods for using the silicon-containing polymers to inhibit dissolved aluminosilicates (such as sodium aluminosilicate) from depositing on surfaces to form scale, but not for flocculating DSP.

It has been now discovered that greatly improved flocculation of suspended solids, especially DSP, from Bayer process streams may be obtained by adding and efficiently mixing a silicon-containing polymer into the Bayer process stream alone or subsequent to, followed by or in association with a conventional flocculant. This treatment is particularly effective in treating bauxite residue solids containing high silicates and sodium aluminosilicates when compared with state-of-the art processes, as exemplified by the patents mentioned above. Such reductions in suspended solids can significantly reduce the need for filtration. Since the suspended solids may contain undesirable impurities, the reductions in suspended solids achieved by practice of the present invention may also result in improved purity of the resultant alumina product.

SUMMARY

The present invention provides silicon-containing polymers, flocculant compositions and processes for the reduction of suspended solids from a process stream of the Bayer alumina process. The processes involve contacting a Bayer process stream with such a silicon-containing polymer and/or flocculant composition to flocculate suspended solids in Bayer process streams. In preferred embodiments, silicon-containing polymers and flocculant compositions described herein are particularly useful for flocculating suspended DSP in Bayer process streams. The Bayer process stream that can advantageously be contacted with the silicon-containing polymers and/or flocculant compositions in accordance with the present invention can be any portion of the feed, e.g., settler feed, settler overflow, blow-off discharge, or from the alumina precipitation (i.e., recovery) circuit. The Bayer process stream contacted with the polymer can also be feed to a mud washer in the washer train.

An embodiment provides a flocculant composition, comprising a silicon-containing polymeric flocculant for a DSP and an anionic polymeric flocculant for a Bayer process red mud. The weight ratio of the amount of the silicon-containing polymeric flocculant to the amount of the anionic polymeric flocculant in said flocculant composition may be in the range of about 100:1 to about 1:10, e.g., in the range of about 10:1 to about 1:2, such as about 1:1. Another embodiment provides a flocculation method, comprising intermixing such a flocculant composition with a Bayer process stream in an amount effective to flocculate at least a portion of solids suspended therein, wherein the suspended solids are selected from the group consisting of red mud, DSP, and mixtures thereof.

Another embodiment provides a flocculation method, comprising intermixing a silicon-containing polymer flocculant with a Bayer process stream in an amount effective to thereby flocculate at least a portion of a DSP suspended therein; and separating at least a portion of the flocculated DSP thus formed.

Another embodiment provides a water-soluble or water-dispersible silicon-containing polymer comprising a silicon-containing group attached thereto, wherein the silicon-containing polymer is configured so that the silicon-containing group enhances an ability of the silicon-containing polymer to flocculate a suspended DSP. In an embodiment, the silicon-containing group is —Si(OR)$_3$, where R is Na$^+$, K$^+$, or NH$_4^+$. In another embodiment, the amount of the silicon-containing group in the silicon-containing polymer is at least about 5 weight %. Another embodiment provides a flocculation method, comprising intermixing such a silicon-containing polymer with a Bayer process stream in an amount effective to flocculate at least a portion of solids suspended therein, wherein the suspended solids are selected from the group consisting of red mud, DSP, and mixtures thereof.

Another embodiment provides a hydroxamated water-soluble or water-dispersible silicon-containing polymer comprising a silicon-containing group attached thereto. Another embodiment provides a flocculation method, comprising intermixing such a hydroxamated silicon-containing polymer with a Bayer process stream in an amount effective to flocculate at least a portion of solids suspended therein, wherein the suspended solids are selected from the group consisting of red mud, DSP, and mixtures thereof.

These and other embodiments are described in greater detail below.

DETAILED DESCRIPTION

The following description and examples illustrate preferred embodiments of the present invention in detail. Those of skill in the art will recognize that there are numerous variations and modifications of this invention that are encompassed by its scope. Accordingly, the description of preferred embodiments should not be deemed to limit the scope of the present invention.

It has now been found that various silicon-containing polymers are useful as flocculants for suspended Bayer process solids, particularly those containing suspended DSP. Examples of silicon-containing polymers useful in the flocculation methods described herein (e.g., as flocculants for DSP) include those described in U.S. Pat. No. 6,814,873 and U.S. Pat. Pub. Nos. 2004/0162406 A1, 2005/0010008 A2, and 2005/0274926 A2, all of which are hereby incorporated by reference in their entireties, and particularly for the purpose of describing silicon-containing polymer flocculants and methods of making them. Other examples of silicon-containing polymeric flocculants for DSP are described herein. Those skilled in the art can use routine experimentation in view of the guidance provided herein to identify other silicon-containing polymeric flocculants useful in the methods described herein, e.g., as flocculants for DSP.

An embodiment provides a water-soluble or water-dispersible silicon-containing polymer comprising a silicon-containing group attached thereto, wherein the silicon-containing polymer is configured so that the silicon-containing group enhances an ability of the silicon-containing polymer to flocculate a suspended DSP.

An embodiment provides a water-soluble or water-dispersible silicon-containing polymer, e.g. a polymer that contains a pendant silicon-containing group(s) such as a silane. In an embodiment, the silicon-containing polymer is a flocculant for a DSP, e.g., is configured so that the silicon-containing group(s) enhances an ability of the silicon-containing polymer to flocculate a suspended DSP. The silicon-containing polymer may be included in a flocculant composition. In an embodiment, the flocculant composition contains an anionic polymer, such as an anionic polymeric flocculant for a Bayer process red mud. Various silicon-containing polymers, polymer compositions and methods for using them are described below.

Examples of silicon-containing polymers include those having pendant silane groups, e.g., silicon-containing pendant groups of the Formula (I) attached thereto:

$$—Si(OR)_3 \quad (I)$$

wherein each R is independently hydrogen, C$_{1-20}$ alkyl, C$_{2-20}$ alkenyl, C$_{6-12}$ aryl, C$_{7-20}$ arylkyl, a group I metal ion, a group II metal ion, or NR'$_4^+$; where each R' is independently hydrogen, C$_{1-20}$ alkyl, C$_{2-20}$ alkenyl, C$_{6-12}$ aryl, and C$_{7-20}$ arylkyl; and where R and R' are each independently unsubstituted, hydroxy-substituted, or beta-hydroxy substituted. Examples of R groups include lower alkyl groups, e.g., C$_{1-6}$ alkyl groups and C$_{1-3}$ alkyl groups; phenyl, benzyl, Na$^+$, K$^+$, and NH$_4^+$. The amount of silicon-containing group in the silicon-containing polymer can vary over a relatively broad range, and the polymer can be configured to provide enhanced flocculation of solids.

Routine experimentation informed by the guidance provided herein may be used to select a silicon-containing polymer that is effective for a particular application, e.g., by selecting a polymer backbone, molecular weight, silicon-containing group and amount thereof to make a polymer that is effective to flocculate DSP. For example, routine experimentation informed by the guidance provided herein may be used to configure the polymer so that the silicon-containing group(s) enhances an ability of the silicon-containing polymer to flocculate a suspended DSP. Suitable amounts of silicon-containing groups in the silicon-containing polymer may vary, depending on the type of the polymer and the application. For example, in an embodiment the silicon-containing polymer contains at least about 1 weight % of the —$Si(OR)_3$ group, e.g., at least about 5 weight % of the —$Si(OR)_3$ group. Routine experimentation informed by the guidance provided herein may be used to select a polymer having an appropriate molecular weight. For example, the molecular weight of the silicon-containing polymer may vary over a broad range, e.g. from about 1,000 to about 15 million, and is often about 10,000 or greater, or about 100,000 or greater, e.g., in the range of from about 10,000 to about 10 million, such as about 100,000 to about 5 million. Molecular weights as described herein are weight average as determined by high pressure size exclusion chromatography (light scattering detection) unless otherwise stated.

In some embodiments, the —$Si(OR)_3$ group is a trimethoxysilane group (R=methyl) or a triethoxysilane group (R=ethyl). Other alkyl groups can also be advantageously employed as R in the pendant groups of Formula (I). The term "alkyl," as used herein is a broad term and is used in its ordinary sense, including, without limitation, to refer to a straight chain or branched, noncyclic or cyclic, unsaturated or saturated aliphatic hydrocarbon containing from one, two, three, four, five, six, seven, eight, nine, or ten carbon atoms, while the term "lower alkyl" has the same meaning as alkyl but contains one, two, three, four, five, or six carbon atoms. Representative saturated straight chain alkyl groups include methyl, ethyl, n-propyl, n-butyl, n-pentyl, n-hexyl, and the like. Examples of saturated branched alkyl groups include isopropyl, sec-butyl, isobutyl, tert-butyl, isopentyl, and the like. Representative saturated cyclic alkyl groups include cyclopropyl, cyclobutyl, cyclopentyl, cyclohexyl, —$CH_2$cyclopropyl, —$CH_2$cyclobutyl, —$CH_2$cyclopentyl, —$CH_2$cyclohexyl, and the like. Representative unsaturated cyclic alkyl groups include cyclopentenyl and cyclohexenyl, and the like. Cyclic alkyl groups may also be referred to as "homocyclic rings" and include di- and poly-homocyclic rings such as decalin and adamantane. Unsaturated alkyl groups contain at least one double or triple bond between adjacent carbon atoms (referred to as an "alkenyl" or "alkynyl," respectively). Representative straight chain and branched alkenyl groups include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like. Representative straight chain and branched alkynyl groups include acetylenyl, propynyl, 1-butynyl, 2-butynyl, 1-pentynyl, 2-pentynyl, 3-methyl-1 butynyl, and the like. While unsubstituted alkyl groups are generally preferred, substituted alkyl groups can also be advantageously employed.

In certain embodiments, R can be or include an aryl group. The term "aryl" as used herein is a broad term and is used in its ordinary sense, including, without limitation, to refer to an aromatic carbocyclic moiety such as phenyl or naphthyl, as well as arylalkyl and alkylaryl moieties. The term "arylalkyl" as used herein is a broad term and is used in its ordinary sense, including, without limitation, to refer to an alkyl having at least one alkyl hydrogen atom replaced with an aryl moiety, such as benzyl, —$CH_2$(1 or 2-naphthyl), —$(CH_2)_2$phenyl, —$(CH_2)_3$phenyl, —CH$(phenyl)_2$, and the like. The term "alkylaryl" as used herein is a broad term and is used in its ordinary sense, including, without limitation, to refer to an aryl having at least one aryl hydrogen atom replaced with an alkyl moiety. Particularly preferred aryl groups include $C_{6-12}$ aryl and $C_{7-20}$ aralkyl groups.

While unsubstituted alkyl or aryl groups are generally preferred, in certain embodiments substituted alkyl or aryl groups can advantageously be employed. The term "substituted," as used herein is a broad term and is used in its ordinary sense, including, without limitation, to refer to any of the above groups (e.g., alkyl, aryl) wherein at least one hydrogen atom is replaced with a substituent. In the case of a keto substituent ("—C(═O)—") two hydrogen atoms are replaced. When substituted, "substituents," within the context of preferred embodiment, include halogen, hydroxy, cyano, nitro, sulfonamide, carboxamide, carboxyl, ether, carbonyl, amino, alkylamino, dialkylamino, alkoxy, alkylthio, haloalkyl, and the like. Alternatively, one or more of the carbon atoms of the R group can be substituted by a heteroatom, e.g., nitrogen, oxygen, or sulfur.

In some embodiments, the silicon-containing group includes one or more hydroxy groups, e.g., a beta hydroxy group, as substituents. For example, in some embodiments the silicon-containing polymer includes one or more hydroxamate (—CONH(OH)) groups. Any of the silicon-containing polymers described herein can be hydroxamated. For example, an embodiment provides a hydroxamated water-soluble or water-dispersible silicon-containing polymer comprising a silicon-containing group attached thereto.

The pendant silicon-containing group(s) can be bonded directly to an atom (e.g., a carbon atom) in the backbone of the silicon-containing polymer, or to the backbone of the polymer through a suitable linking group. Examples of linking groups include fully saturated linear $C_{1-6}$ alkyl chains, as well as alkyl chains with ether linkages (e.g., alkoxy or poly (alkoxy) linking groups). Other linking groups include alkyl chains with amide linkages and hydroxy substituents, for example:

—C(═O)(NH)$CH_2CH_2CH_2$—

—$NHCH_2CHOHCH_2OCH_2CH_2CH_2$—

—NHC(═O)$NHCH_2CH_2CH_2$—

In an embodiment, the pendant silicon-containing groups are included on or attached to the polymer backbone and/or any suitable portion of the polymer (e.g., as an end group, on a grafted portion or side chain, or the like). In certain embodiments, it can be desirable to include other pendant groups in addition to the silicon-containing group pendant group. Examples of other pendant groups include carboxylate groups such as —C(═O)$O^-$ or —C(═O)OH, amide groups such as —C(═O)$NH_2$, hydroxamated groups such as —C(═O)$NHO^-$, and amine groups such as —$NH_2$. Other pendant groups can also be employed, as will be appreciated by one of skill in the art.

In some embodiments, the polymer backbone comprises substituted ethylene recurring units, e.g., —$[CH_2C(R^x)H]$—, wherein $R^x$ comprises a silane group with or without a linking group as described elsewhere herein, or another pendant substituent. A single kind of linking group can be employed, or combinations of linking groups can be employed. In certain embodiments, additional hydrogen atoms of the ethylene recurring unit can be substituted by a pendant silane group or some other pendant group.

The silicon-containing polymers described herein can be made in a variety of ways. See, e.g., U.S. Pat. No. 6,814,873 and U.S. Pat. Pub. Nos. 2004/0162406; 2005/0010008; and 2005/0274926, all of which are hereby incorporated herein by reference, and particularly for the purpose of describing silicon-containing polymers and methods for making them. For example, in some embodiments they can be made by polymerizing a monomer containing the group —Si(OR)$_3$ of Formula (I), or by copolymerizing such a monomer with one or more co-monomers. Suitable silane monomers include, but are not limited to, vinyltriethoxysilane, vinyltrimethoxysilane, allyltriethoxysilane, butenyl-triethoxysilane, γ-N-acrylamidopropyltriethoxysilane, p-triethoxysilylstyrene, 2-(methyl-trimethoxysilyl)acrylic acid, 2-(methyltrimethoxysilyl)-1,4-butadiene, N-triethoxysilylpropyl-maleimide and other reaction products of maleic anhydride and other unsaturated anhydrides with amino compounds containing a —Si(OR)$_3$ group. The monomers or resulting recurring units can be hydrolyzed by aqueous base, either before or after polymerization. Suitable comonomers include, but are not limited to, vinyl acetate, acrylonitrile, styrene, acrylic acid and it esters, acrylamide and substituted acrylamides such as acrylamidomethylpropanesulfonic acid. The copolymers can also be graft copolymers, such as polyacrylic acid-g-poly(vinyltriethoxysilane) or poly(vinylacetate-co-crotonic acid)-g-poly (vinyltriethoxysilane). These polymers can be made in a variety of solvents such as acetone, tetrahydrofuran, toluene, xylene, and the like. In some cases, the polymer is soluble in the reaction solvent and can be conveniently recovered by stripping off the solvent, or, if the polymer is not soluble in the reaction solvent, the product can be conveniently recovered by filtration; however, any suitable recovery method can be employed. Suitable initiators include 2,2'azobis-(2,4-dimethylvaleronitrile) and 2,2-azobisisobutyronitrile, benzoylperoxide, cumene hydroperoxide, and the like.

In some embodiments the silicon-containing polymers described herein can be made by reacting a compound containing a —Si(OR)$_3$ group as well as reactive group which can react with either a pendant group or backbone atom of an existing polymer. Polyamines can be reacted with a variety of compounds containing one or more —Si(OR)$_3$ groups to give polymers which can be used in the preferred embodiments. The reactive group can be an alkyl halide group, such as chloropropyl, bromoethyl, chloromethyl, bromoundecyl, or other suitable group. The compound containing one or more —Si(OR)$_3$ groups can contain an epoxy functionality such as glycidoxypropyl, 1,2-epoxyamyl, 1,2-epoxydecyl, or 3,4-epoxycyclo-hexylethyl. The reactive group can also be a combination of a hydroxyl group and a halide, such as 3-chloro-2-hydroxypropyl. The reactive moiety can also contain an isocyanate group, such as isocyanatopropyl or isocyanatomethyl, which reacts to form a urea linkage. In addition, silanes containing anhydride groups, such as triethoxysilylpropyl-succinic anhydride, can be used. The reactions can be carried out either neat or in a suitable solvent. In addition, other functional groups such as alkyl groups can added by reacting other amino groups or nitrogen atoms on the polymer with alkyl halides, epoxide or isocyanates. The polyamines can be made by a variety of methods. For example, they can be made by a ring opening polymerization of aziridine or similar compounds. They also can be made by condensation reactions of amines such as ammonia, methylamine, dimethylamine, ethylenediamine, or the like with reactive compounds such as 1,2-dichloroethane, epichlorohydrin, epibromohydrin or similar compounds.

Polymers containing anhydride groups can be reacted with a variety of silicon-containing compounds (e.g., containing one or more —Si(OR)$_3$ groups) to make embodiments of the silicon-containing polymers described herein. Suitable starting polymers include maleic anhydride homopolymer, and copolymers of maleic anhydride with monomers such as styrene, ethylene, methylvinylether, and the like. The starting polymer can also be a graft copolymer such as poly(1,4-butadiene)-g-maleic anhydride or polyethylene-g-maleic anhydride, or the like. Other suitable anhydride monomers include itaconic and citraconic anhydrides. Suitable reactive silane compounds include but are not limited to γ-aminopropyltriethoxysilane, bis(γ-triethoxysilylpropyl)amine, N-phenyl-γ aminopropyltriethoxysilane, p-aminophenyltriethoxysilane, 3-(m-aminophenoxypropyl)-trimethoxysilane, γ-aminobutyltriethoxylsilane, and the like. Other functional groups can be added to the polymer by reacting it with amines, alcohols, and other compounds.

Polymers containing hydroxyl groups can be reacted with an epoxy functionality, such as glycidoxypropyltrimethoxysiliane. Examples of polymers that contain hydroyxl groups include polysaccharides such as starch and hydroxyethylcellulose.

In an embodiment, the silicon-containing polymer is selected from the group consisting of a silicon-containing polyethyleneimine, a vinyl triethoxysilane copolymer, a copolymer of acrylic acid and triethoxysilylpropylacrylamide, a copolymer of acrylic acid and triethoxyvinylsilane, a silicon-containing polysaccharide (e.g., a silicon-containing starch or a silicon-containing cellulose such as hydroxyethylcellulose), a silicon-containing styrene/maleic anhydride copolymer, a silicon-containing maleic anhydride/alkyl vinyl ether copolymer (e.g., a silicon-containing maleic anhydride/methyl vinyl ether copolymer), and mixtures thereof.

In an embodiment, the silicon-containing polymer comprises recurring units, the recurring units comprising a first recurring unit having a structure —[CH$_2$C(R$^1$)H]— and a second recurring unit having a structure —[CH$_2$C(R$^2$)H]—, wherein R$^1$ is —C(=O)O$^-$, and wherein R$^2$ is —C(=O)NHCH$_2$CH$_2$CH$_2$CH$_2$Si(O$^-$)$_3$. In an embodiment, the amount of the first recurring unit is at least about 90% e.g., at least about 96%, by number based on total number of recurring units in the polymer.

In an embodiment, the silicon-containing polymer comprises recurring units, the recurring units comprising a first recurring unit having a structure —[CH$_2$C(R$^1$)H]—, a second recurring unit having a structure —[CH$_2$C(R$^2$)H]—, a third recurring unit having a structure —[CH$_2$C(R$^3$)H]—, a fourth recurring unit having a structure —[CH$_2$C(R$^4$)H]—, and a fifth recurring unit having a structure —[CH$_2$C(R$^5$)H]—, wherein R$^1$ is C(=O)NH$_2$, wherein R$^2$ is —C(=O)O$^-$, wherein R$^3$ is —C(=O)NHO$^-$, wherein R$^4$ is —NHCH$_2$CH(OH)CH$_2$OCH$_2$CH$_2$CH$_2$Si(O$^-$)$_3$, and wherein R$^5$ is —NH$_2$. In an embodiment, the silicon-containing polymer comprises up to about 50% by number of the first recurring unit, up to about 90% by number of the second recurring unit, from about 1% to about 60% by number of the third recurring unit, from about 1% to about 30% by number of the fourth recurring unit, and from about 1% to about 30% by number of the fifth recurring unit. In an embodiment, the first recurring unit and the second recurring unit together comprise about 80% to about 85% by number of the recurring units, the third recurring unit comprises about 5% to about 15% by number of the recurring units, and the fourth and fifth recurring units together comprise the remainder of the recurring units.

In an embodiment, the silicon-containing polymer comprises recurring units, the recurring units comprising a first recurring unit having a structure —[CH$_2$C(R$^1$)H]—, a second recurring unit having a structure —[CH$_2$C(R$^2$)H]—, a third recurring unit having a structure —[CH$_2$C(R$^3$)H]—, a fourth recurring unit having a structure —[CH$_2$C(R$^4$)H]—, and a fifth recurring unit having a structure —[CH$_2$C(R$^5$)H]—, wherein R$^1$ is C(=O)NH$_2$, wherein R$^2$ is —C(=O)O$^-$, wherein R$^3$ is —C(=O)NHO$^-$, wherein R$^4$ is —NHC(=O)NHCH$_2$CH$_2$CH$_2$Si(O$^-$)$_3$, and wherein R$^5$ is —NH$_2$. In an embodiment, the first recurring unit and the second recurring unit together comprise about 65% to about 70% by number of the recurring units, the third recurring unit comprises about 20 to about 30% by number of the recurring units, and the fourth and fifth recurring units together comprise the remainder of the recurring units.

In an embodiment, the silicon-containing polymer comprises recurring units, the recurring units comprising a first recurring unit having a structure —[CH$_2$C(R$^1$)H]—, a second recurring unit having a structure —[CH$_2$C(R$^2$)H]—, a third recurring unit having a structure —[CH$_2$C(R$^3$)H]—, a fourth recurring unit having a structure —[CH$_2$C(R$^4$)H]—, and a fifth recurring unit having a structure —[CH$_2$C(R$^5$)H]—, wherein R$^1$ is C(=O)NH$_2$, wherein R$^2$ is —C(=O)O$^-$, wherein R$^3$ is —C(=O)NHO$^-$, wherein R$^4$ is —NHCH$_2$CH(OH)CH$_2$OCH$_2$CH$_2$CH$_2$Si(O$^-$)$_3$, and wherein R$^5$ is —NH$_2$. In an embodiment, the first recurring unit and the second recurring unit together comprise about 80% to about 85% by number of the recurring units, the third recurring unit comprises about 5% to about 15% by number of the recurring units, and the fourth and fifth recurring units together comprise the remainder of the recurring units.

The flocculant compositions and methods for using them described herein can include any suitable flocculant or combinations of flocculants. For example, an embodiment provides a flocculant composition, comprising a silicon-containing polymer flocculant as described herein (e.g., a silicon-containing polymer flocculant for a DSP) and a polymer flocculant for a Bayer process red mud. In an embodiment, the polymer flocculant for the Bayer process red mud can be an anionic polymeric flocculant. In an embodiment, the weight ratio of the amount of the silicon-containing polymer flocculant to the amount of the anionic polymeric flocculant in the flocculant composition is in the range of about 100:1 to about 1:10, e.g., in the range of about 10:1 to about 1:2, such as about 1:1.

Polymeric flocculants useful in the Bayer process include anionic polymers known by those skilled in the art to be useful as polymer flocculants for Bayer process red mud. Examples of useful anionic polymer flocculants include homo-polymers of acrylic acid or acrylates; copolymers of acrylic acid or acrylate monomers; homo-polymers of methacrylic acid or methacrylates; copolymers of methacrylic acid or methacrylate monomers; polyacrylamides, alkali metal, alkaline earth metal or ammonium salts of said acids; polymers containing hydroxamic acid or salt groups; or a combination of any of the foregoing. In an embodiment, the anionic polymeric flocculant is a hydroxamated polymer, e.g., a hydroxamated polyacrylamide. The amount of anionic recurring units in the anionic polymer may vary over a broad range. For example, in an embodiment, the anionic polymeric flocculant comprises at least about 50% anionic recurring units. Weight average molecular weights of anionic polymer flocculants are typically about 1,000 or greater, e.g., about 10,000 or greater; about 100,000 or greater; about 1,000,000 or greater, or about 5,000,000 or greater. In some embodiments, molecular weights are 30,000,000 or less. Those skilled in the art will appreciate that the foregoing provides descriptions of ranges between each of the stated values, and thus will understand, for example, that the anionic polymer flocculant may have a weight average molecular weight of from about 5,000,000 to about 30,000,000.

Other types of flocculants commonly employed in the Bayer process include nonionic flocculants such as starch (e.g., pregelatinized, from corn or potato), polysaccharides, alginates, dextran or flour. While anionic flocculants are particularly preferred for use in the Bayer process, selected cationic, nonionic, or amphoteric flocculants can also be advantageously employed in suitable amounts, as will be appreciated by one skilled in the art.

Flocculant compositions, including those containing a silicon-containing polymer flocculant as described herein (e.g., a silicon-containing polymer flocculant for a DSP) and/or a polymer flocculant for a Bayer process red mud, may be concentrated or diluted (e.g., in water), and may include additional ingredients. It will be appreciated by those skilled in the art that Bayer process sites are often located far from flocculant manufacturers, and thus it is often desirable to transport the flocculant composition to the Bayer process site in a relatively concentrated form in order to minimize shipping costs. The concentrated flocculant composition can then be conveniently diluted in an aqueous medium on site to form a dilute flocculant composition, at or about the time that it is to be used. The aqueous medium with which the concentrated flocculant composition is diluted may be water in a relatively pure form, recycled water from various sources, or an aqueous Bayer process stream.

In view of the foregoing, those skilled in the art will appreciate that a flocculant composition, including those containing a silicon-containing polymer flocculant as described herein (e.g., a silicon-containing polymer flocculant for a DSP) and/or a polymer flocculant for a Bayer process red mud, may be formed during manufacture (e.g., in a relatively concentrated form) and/or prior to use, e.g., by on site intermixing with an aqueous medium, and that it may contain additional components. Examples of additional components include water, salts, stabilizers, and pH adjusting agents, as well as ingredients such as DSP and Bayer process red mud. The DSP may comprise, for example, a sodium aluminosilicate. In an embodiment, at least a portion of the DSP is suspended in the flocculant composition. The concentration of any particular polymer flocculant in a flocculant composition may vary over a broad range, e.g., from about 0.1 part per million to about 100% (e.g., highly concentrated form containing little or no water). For relatively dilute flocculant compositions, examples of suitable concentrations of the anionic polymer flocculant in the flocculant composition include amounts in the range of from about 0.1 part per million to about 1,000 parts per million, and examples of suitable concentrations of the silicon-containing polymeric flocculant in the flocculant composition include amounts in the range of from about one part per million to about 500 parts per million. For flocculant compositions containing multiple polymer flocculant components, including those containing a silicon-containing polymer flocculant as described herein (e.g., a silicon-containing polymer flocculant for a DSP) and a polymer flocculant for a Bayer process red mud, it will be appreciated that the components can be combined at or near the time or manufacture and/or shipping, or combined at or near the time of use, e.g., on site in the vicinity of a Bayer process stream.

The polymer flocculants and flocculant compositions described herein are useful as flocculants. For example, an embodiment provides a flocculation method, comprising intermixing a silicon-containing polymer flocculant and/or flocculant composition as described herein with a Bayer process stream in an amount effective to flocculate at least a portion of solids suspended therein. In an embodiment, the suspended solids include one or more of red mud and/or DSP. Another embodiment provides a flocculation method, comprising intermixing a silicon-containing polymer flocculant with a Bayer process stream in an amount effective to thereby flocculate at least a portion of a desilication product suspended therein; and separating at least a portion of the flocculated desilication product thus formed.

An embodiment provides a method of reducing the level of suspended solids in a Bayer process stream whereby a polymer with the pendant group or end group containing —Si(OR)$_3$ (where R is H, an alkyl group, Na, K, or NH$_4$) is added alone, subsequent to, followed by, or in association with a conventional flocculant in order to effectively flocculate the suspended solids so that they can be conveniently separated from the process stream. The amount of reduction in suspended solids content can be measured and compared with controls, which generally comprise state-of-the-art alumina process samples. The amounts of polymer flocculant(s) effective to flocculate a particular type of solids in a particular Bayer process stream can be determined by routine experimentation informed by the guidance provided herein. The amount of flocculant is often in the range of from about 0.01 lb. to about 40 lbs. of flocculant per ton of solids (dry basis), e.g., in various ranges from about 0.1, 0.2, 0.3, 0.4, 0.5, 0.6, 0.7, 0.8, or 0.9 lb. to about 15, 20, 25, 30, or 35 lbs. Those skilled in the art will appreciate that the foregoing provides descriptions of ranges between each of the stated values, and thus will understand, for example, that the polymer flocculant can be used in an amount in the range of from about 1 lb. to about 10 lbs. of flocculant per ton of solids (dry basis).

In an embodiment, the Bayer process stream comprises suspended DSP, e.g., from about 0.02 grams per liter to about 200 grams per liter of suspended DSP. As illustrated in the examples below, in some embodiments the polymer flocculants and flocculant compositions described herein are particularly useful for flocculating suspended DSP in Bayer process streams.

In the context of commercial plant operation, the polymer flocculants and/or flocculant compositions can be added to the settler feed, as are the anionic flocculants described above. Alternatively, the polymers can be added to the overflow from a primary settler or to the blow-off from the digesters. The polymers can also be used in the settling of muds in the mud washing circuit. The polymers, alone or in combination with other process chemicals, can advantageously be added at other points in the commercial plant operation as well.

EXAMPLES

Test Procedure

A synthetic Bayer liquor is made by adding 256 g sodium aluminate, 66 g sodium hydroxide, and 40 g sodium carbonate to water to make a total of 1000 ml and heating to 100° C.

A DSP is made by heating kaolin in sodium hydroxide solution to 150° C., followed by filtration, washing, and drying to recover dry DSP. Red mud solids are obtained from mud slurry typically being discharged to waste at an operating Bayer plant. This mud is washed free of the associated dilute sodium aluminate solution, dried and ground.

For the settling tests, either a DSP alone or a mixture of DSP and red mud solids are dispersed in the above liquor, generally to give a slurry containing about 40 g/l of suspended solids. Dilute reagent is mixed into slurry contained in a graduated cylinder, using a perforated plunger, and the time to settle a fixed distance is measured so that a settling rate for the flocculated solids could be calculated. Also, after five minutes a sample of the supernatant liquor is taken and filtered; the solids collected on the filter are then washed and dried to give a measure of the supernatant clarity.

Example 1

Reagent A 81.4 g of a water-free polyethyleneimine is mixed with 18.6 g of glycidoxypropyltrimethoxysilane and the mixture is heated at 60° C. for 16 hours. 50 g of the resulting friable gel is mixed with 5 g NaOH and water to a total of 250 g and heated to 90° C. to make a 20% solution. The effectiveness of Reagent A in enhancing flocculation when employed in combination with commercially available flocculants is tested. The commercial flocculants tested included Superfloc HX-400, a hydroxamate-based flocculant based on polyacrylamide, and Superfloc 1227, an ammonium polyacrylate flocculant, both available from Cytec Industries Inc. of West Paterson, N.J., USA. Unreacted polyethyleneimine is employed as a control. As demonstrated by the data presented in Table 1, Reagent A in combination with flocculant significantly increased settling rate in both a 30/70 and a 40/60 DSP/red mud mixture when compared to flocculant alone, or flocculant in combination with polyethyleneimine control. A significant improvement in clarity is also observed for the combination of Reagent A and flocculant. Reagent A is also effective in flocculating DSP even without added commercial flocculant.

TABLE 1

| | Suspended solids | Reagent | Dosage (ppm) | Settling Rate (m/h) | Clarity (g/l) |
|---|---|---|---|---|---|
| 1 | 100% DSP | PEI[a] | 100 | No floc[b] | — |
| 2 | 100% DSP | A | 100 | 9 | — |
| 3 | 30/70 DSP/red mud | HX-400[c] | 10 | 6.5 | 3.58 |
| 4 | 30/70 DSP/red mud | PEI[a]/HX-400[c] | 100/10 | Too cloudy | 3.88 |
| 5 | 30/70 DSP/red mud | A/HX-400[c] | 100/10 | 10 | 0.50 |
| 6 | 30/70 DSP/red mud | SF1227[d] | 3.3 | Too cloudy | 10.3 |
| 7 | 30/70 DSP/red mud | PEI[a]/SF1227[d] | 100/3.3 | Too cloudy | 5.27 |
| 8 | 30/70 DSP/red mud | A/SF1227[d] | 100/3.3 | 18 | 0.77 |
| 9 | 40/60 DSP/red mud | PEI[a]/HX-400[c] | 100/10 | 7 | 2.70 |
| 10 | 40/60 DSP/red mud | A/HX-400[c] | 100/10 | 9.4 | 0.43 |
| 11 | 40/60 DSP/red mud | PEI[a]/SF1227[d] | 100/3.3 | Too cloudy | 3.99 |
| 12 | 40/60 DSP/red mud | A/SF1227[d] | 100/3.3 | 20 | 0.62 |

[a]Polyethyleneimine used a starting material for Reagent A - comparative example.
[b]No flocculation
[c]Superfloc HX-400 flocculant
[d]Superfloc 1227 flocculant Example 2

Reagent B 32 g acrylamide, 82.8 g water and 11.1 g of 50% NaOH are mixed. 8 g vinyltriethoxysilane and 0.4 g AIBN (azobisisobutyronitrile) in 12 ml ethanol are added and the mixture is heated at 80° C. for 16 hours. 20 g of the reaction mixture are mixed with 5.4 g 50% NaOH and 4.6 g water and heated to 90° C. to make a 20% solution. The product is Reagent B. At a dosage of 200 ppm, Reagent B is found to flocculate suspended DSP.

Example 3

Reagent C

A slurry of 9 g Pearl starch (National Starch and Chemical Co., Bridgewater, N.J., USA) is mixed with 2 g glycidoxypropyltrimethoxysilane and stirred at room temperature for 16 hours. The reaction product is partially dried at 50° C., then heated to 95° C. in 20 g/l aqueous NaOH to make a 3% solution. The product is Reagent C. As demonstrated by the data presented in Table 2, Reagent C exhibits significantly increased settling rates for suspended DSP or red mud, compared to unfunctionalized pearl starch, indicating that Reagent C is an effective flocculating agent in its own right. Reagent C is even more effective in flocculating suspended DSP/red mud mixtures (10/70, 20/80, and a 40/60). Good clarity is also observed for red mud and DSP/red mud mixtures treated with Reagent C.

TABLE 2

| | Suspended solids | Reagent | Dosage (ppm) | Settling Rate (m/h) | Clarity (g/l) |
|---|---|---|---|---|---|
| 13 | 100% DSP | starch[a] | 100 | No floc[b] | — |
| 14 | 100% DSP | C | 100 | 7 | — |
| 15 | 100% red mud | C | 200 | 5.1 | 0.66 |
| 16 | 10/90 DSP/ red mud | C | 200 | 4.6 | 0.60 |
| 17 | 20/80 DSP/ red mud | C | 200 | 3.3 | 0.68 |
| 18 | 40/60 DSP/ red mud | C | 200 | 1.5 2.1 | 0.67 0.88 |

[a]Pearl starch as used for starting material for Reagent C - comparative example.
[b]Superfloc HX-400 flocculant As demonstrated by the data presented in Table 3, Reagent C significantly increases the settling rate of red mud and substantially improves clarity when employed in combination with Superfloc HX-400.

TABLE 3

| | Suspended solids | Reagent | Dosage (ppm) | Settling Rate (m/h) | Clarity (g/l) |
|---|---|---|---|---|---|
| 19 | 100% red mud | HX-400[b] | 10 | 24 | 0.56 |
| 20 | 100% red mud | C/HX-400[b] | 25/10 | 27 | 0.30 |
| 21 | 10/90 DSP/ red mud | HX-400[b] | 10 | 18 | 1.40 |
| 22 | 10/90 DSP/ red mud | C/HX-400[b] | 25/10 | 18 | 0.34 |
| 23 | 20/80 DSP/ red mud | HX-400[b] | 10 | 12.7 | 1.82 |
| 24 | 20/80 DSP/ red mud | C/HX-400[b] | 25/10 | 10.8 | 0.45 |
| 25 | 30/70 DSP/ red mud | HX-400[b] | 10 | 8.0 | 2.7 |
| 26 | 30/70 DSP/ red mud | C/HX-400[b] | 25/10 | 8.3 | 0.49 |
| 27 | 40/60 DSP/ red mud | HX-400[b] | 10 | 5.1 | 3.36 |
| 28 | 40/60 DSP/ red mud | C/HX-400[b] | 25/10 | 4.9 | 0.85 |

[b]Superfloc HX-400 flocculant

As demonstrated by the data presented in Table 4, Reagent C improves flocculation of DSP/red mud mixtures (10/70, 20/80, and a 40/60 when employed in combination with Superfloc 1227. Clarity is also substantially improved when Reagent C is employed in combination with Superfloc 1227.

TABLE 4

| | Suspended solids | Reagent | Dosage (ppm) | Settling Rate (m/h) | Clarity (g/l) |
|---|---|---|---|---|---|
| 29 | 100% red mud | SF1227[c] | 3.3 | Too cloudy | 5.9 |
| 30 | 100% red mud | C/SF1227[c] | 25/3.3 | Too cloudy | 1.22 |
| 31 | 10/90 DSP/ red mud | SF1227[c] | 3.3 | Too cloudy | 11.3 |
| 32 | 10/90 DSP/ red mud | C/SF1227[c] | 25/3.3 | 22 | 1.10 |
| 33 | 20/80 DSP/ red mud | SF1227[c] | 3.3 | Too cloudy | 11.6 |
| 34 | 20/80 DSP/ red mud | C/SF1227[c] | 25/3.3 | 12.0 | 1.38 |
| 35 | 30/70 DSP/ red mud | SF1227[c] | 3.3 | Too cloudy | 13.7 |
| 36 | 30/70 DSP/ red mud | C/SF1227[c] | 25/3.3 | 9.0 | 1.33 |
| 37 | 40/60 DSP/ red mud | SF1227[c] | 3.3 | Too cloudy | 17.2 |
| 38 | 40/60 DSP/ red mud | C/SF1227[c] | 25/3.3 | 5.5 | 1.56 |

[c]Superfloc 1227 flocculant

Example 4

Reagent D 8 g of dried hydroxyethylcellulose are mixed with 2 g of glycidoxypropyltrimethoxysilane and heated to 100° C. for 16 hours. 2 g of the reaction product are mixed with 40 ml of aqueous 100 g/l NaOH solution and heated to 95° C. to make a 5% solution. The product is Reagent D.

At a dosage of 500 ppm, Reagent D is observed to flocculate suspended DSP. The hydroxyethylcellulose used as starting material (comparative example) produces no flocculation of suspended DSP at the same dosage of 500 ppm.

Example 5a

Reagent E

A reagent is made by a process similar to that of Example 3. A slurry of 0.080 moles (12.96 g) Pearl starch, 0.015 moles (3.55 g) of glycidoxypropyltrimethoxysilane, and 0.005 moles (0.36 g) epoxybutane is mixed at room temperature for 16 hours. The reaction product is partially dried, then heated in aqueous 20 g/l NaOH to 95° C. to make a 3% solution. The product is Reagent E.

Example 5b

Reagent F

A reagent is made by a process similar to that of Example 5a, except that 0.005 moles (0.92 g) epoxydodecane is used instead of epoxybutane. The product is Reagent F.

Example 5c

Reagent G

A reagent is made by a process similar to that of Example 5a, except 0.005 moles (0.60 g) styreneoxide is used instead of the epoxybutane. The product is Reagent G.

Example 5d

Reagent H

A reagent is made by a process similar to that of Example 5a, except 0.005 moles (1.49 g) glycidylhexa-decylether is used instead of the epoxybutane. The product is Reagent H.

Example 5e

Reagent I

A reagent is made by a process similar to that of Example 5a, except 0.005 moles (0.75 g) glycidylphenyl-ether is used instead of the epoxybutane. The product is Reagent I.

The effectiveness of Reagents E through I without added flocculant is tested in a 40/60 DSP/red mud mixture and exhibits satisfactory settling rate and clarity at a dosage of 200 ppm, as demonstrated by the data in Table 5.

TABLE 5

| | Suspended solids | Reagent | Dosage (ppm) | Settling Rate (m/h) | Clarity (g/l) |
|---|---|---|---|---|---|
| 39 | 40/60 DSP/red mud | E | 200 | 2.3 | 0.77 |
| 40 | 40/60 DSP/red mud | F | 200 | 2.3 | 0.63 |
| 41 | 40/60 DSP/red mud | G | 200 | 3.3 | 0.38 |
| 42 | 40/60 DSP/red mud | H | 200 | 2.9 | 0.82 |
| 43 | 40/60 DSP/red mud | I | 200 | 3.3 | 0.49 |

When employed in combination with Superfloc HX-400, Reagent E and Reagent I improve settling rate and clarity in a 40/60 DSP/red mud mixture, as demonstrated by the data in Table 6.

TABLE 6

| | Suspended solids | Reagent | Dosage (ppm) | Settling Rate (m/h) | Clarity (g/l) |
|---|---|---|---|---|---|
| 44 | 40/60 DSP/red mud | HX-400$^a$ | 10 | Too cloudy | 4.48 |
| 45 | 40/60 DSP/red mud | E/HX-400$^a$ | 25/10 | 6.5 | 0.47 |
| 46 | 40/60 DSP/red mud | E/HX-400$^a$ | 10/20 | 7.4 | 0.52 |
| 47 | 40/60 DSP/red mud | I/HX-400$^a$ | 25/10 | 5.7 | 0.82 |

$^a$Superfloc HX-400 flocculant

Example 6

Reagent J

A 25% solution of N-triethoxysilylpropylacrylamide is made by reacting acryloyl chloride with aminopropyltriethoxysilane in 2-butanone in the presence of triethylamine. The resulting amine chloride is removed by filtration, and the monomer solution is used without any further purification. 46.4 grams of the monomer solution are combined with 57.0 g of acrylic acid and 140 ml of 2-butanone. 60 mg of Vazo® 65B free radical initiator (from E. I. du Pont de Nemours and Company, Wilmington, Del., USA) in 50 ml of 2-butanone is added. The mixture is heated at 50-60° C. for three hours. 37.5 g of sodium hydroxide is added as an aqueous solution and the mixture heated to 80° C. to distill off the 2-butanone. The product is an aqueous solution containing 11.5% polymer, referred to as Reagent J.

At a dosage of 100 ppm, Reagent J is found to flocculate a suspension of suspended DSP.

Example 7

Reagent K

A copolymer of acrylic acid and triethoxyvinylsilane is made in a manner similar to Example 6. The polymer is referred to as Reagent K.

Example 8

Reagents L and M 10.0 g of Gantrez AN 169 (a methylvinylether-maleic anhydride copolymer made by International Specialty Products Inc. of Wayne, N.J., USA) is dissolved in 150 ml of acetone. 1.42 g of aminopropyltriethoxysilane in 50 ml of acetone is added. The mixture gelled. 10.8 g of 50% NaOH is diluted with 250 ml of water and heated to 80° C. The gel is added to the NaOH solution and the acetone boiled off, leaving an aqueous solution containing 7.0% polymer, referred to as Reagent L. A similar product is made in dioxane instead of acetone. The polymer is referred to as Reagent M.

As demonstrated by the data presented in Table 7, Reagents L and M both exhibits significantly increased settling rates for suspended DSP when compared to Gantrez control. Reagent M significantly improves settling when used in combination with Superfloc HX-400 in a 40/60 DSP/red mud mixture and when used in combination with Superfloc 1227 in a 30/70 DSP/red mud mixture.

TABLE 7

| | Suspended solids | Reagent | Dosage (ppm) | Settling Rate (m/h) | Clarity (g/l) |
|---|---|---|---|---|---|
| 48 | 100% DSP | L | 100 | 4.0 | — |
| 49 | 100% DSP | M | 100 | 5.0 | — |
| 50 | 100% DSP | Gantrez$^a$ | 100 | No flocc'n | — |
| 51 | 30/70 DSP/red mud | M/HX-400$^b$ | 100/10 | 8.3 | 0.45 |
| 52 | 30/70 DSP/red mud | Gantrez$^a$/HX-400$^b$ | 100/10 | Too cloudy | 5.53 |
| 53 | 30/70 DSP/red mud | M/SF1227$^c$ | 100/5 | 18. | 1.64 |
| 54 | 30/70 DSP/red mud | Gantrez$^a$/SF1227$^c$ | 100/5 | Too cloudy | 10.75 |
| 55 | 40/60 DSP/red mud | M | 200 | 3.0 | 0.72 |
| 56 | 40/60 DSP/red mud | M/HX-400$^b$ | 100/10 | 6.5 | 0.32 |
| 57 | 40/60 DSP/red mud | Gantrez$^a$/HX-400$^b$ | 100/10 | Too cloudy | 6.83 |
| 58 | 40/60 DSP/red mud | M/SF1227$^c$ | 100/5 | Too cloudy | 1.30 |
| 59 | 40/60 DSP/red mud | Gantrez$^a$/SF1227$^c$ | 100/5 | Too cloudy | 17.1 |

$^a$Gantrez AN169 used as starting material for Reagent L and M
$^b$Superfloc HX-400 flocculant
$^c$Superfloc 1227 flocculant

Example 9

Reagent N 10.0 g of Scripset 520 (a styrene-maleic anhydride copolymer made by Hercules Inc., Wilmington, Del., USA) is suspended in a mixture of 40 g of dioxane and 80 g of toluene.

2.19 g of aminopropyl-triethoxysilane in 10 g of toluene is added. The mixture is refluxed for 2 hours and then cooled to ambient temperature. The solid polymer is filtered off, washed with hexane, and dried at 60° C. to yield Reagent N.

As demonstrated by the data presented in Table 8, Reagent N exhibits significantly increased settling rates when used in combination with Superfloc HX-400 in a 40/60 DSP/red mud mixture. Clarity is also significantly improved.

TABLE 8

|  | Suspended solids | Reagent | Dosage (ppm) | Settling Rate (m/h) | Clarity (g/l) |
|---|---|---|---|---|---|
| 60 | 100% DSP | N | 100 | 5.7 | — |
| 61 | 40/60 DSP/red mud | N | 200 | 4.8 | 0.50 |
| 62 | 40/60 DSP/red mud | N/HX-400[a] | 25/10 | 5.5 | 0.33 |
| 63 | 40/60 DSP/red mud | HX-400[a] | 10 | Too cloudy | 4.48 |

[a]Superfloc HX-400 flocculant

Example 10

Reagent O 10.0 g of Gantrez AN 169 is suspended in a mixture of 0.20 g of methanol, 4.0 g of tetrahydrofuran and 96.0 g of dioxane. A solution of 2.84 g of aminopropyltriethoxysilane in 10 g of dioxane is added. The mixture is refluxed for 2 hr and cooled to ambient temperature. A solution of 0.90 g of hydroxylamine hydrochloride in 10 ml of methanol is mixed with a solution of 0.75 g of 95% sodium methoxide in 20 ml of methanol. The solid which formed is allowed to settle and the supernatant solution is added to the polymer mixture, which is stirred for 1 hour at ambient temperature. On standing, the mixture forms a friable gel which is slurried with hexane and filtered. The solid polymer is washed with hexane and dried at 60° C. to yield Reagent O.

Example 11

Reagent P 10.0 g of Gantrez AN 169 is suspended in a mixture of 0.20 g of methanol, 4.0 g of tetrahydrofuran and 96.0 g of dioxane. A solution of 2.84 g of aminopropyltriethoxysilane in 10 g of dioxane is added. The mixture is refluxed for 2 hr and cooled to ambient temperature. 10 g of methanol is added and the mixture is stirred for 1 hour. 100 ml of hexane is added and the solid polymer is filtered off, washed with hexane, and dried at 60° C. to yield Reagent P.

As demonstrated by the data presented in Table 9, Reagents O and P both exhibit significantly increased settling rates when used in combination with Superfloc HX-400 in a 40/60 DSP/red mud mixture. Clarity is also significantly improved.

TABLE 9

|  | Suspended solids | Reagent | Dosage (ppm) | Settling Rate (m/h) | Clarity (g/l) |
|---|---|---|---|---|---|
| 64 | 40/60 DSP/red mud | O | 200 | 2.3 | 0.53 |
| 65 | 40/60 DSP/red mud | Gantrez[a] | 200 | No flocc'n | — |
| 66 | 40/60 DSP/red mud | O/HX-400[b] | 25/10 | 9.0 | 0.20 |
| 67 | 40/60 DSP/red mud | HX-400[b] | 10 | 12.0 | 0.61 |
| 68 | 40/60 DSP/red mud | P | 200 | 1.1 | 1.25 |
| 69 | 40/60 DSP/red mud | P/HX-400[b] | 25/10 | 9.4 | 0.37 |

[a]Gantrez AN169 used as starting material for Reagent O
[b]Superfloc HX-400 flocculant

Example 12

Reagent Q

The silane monomer N-(3-triethoxysilyl)propylacrylamide is prepared as follows. 197.4 g of (3-aminopropyl)triethoxysilane and 89.9 g of triethylamine are dissolved in 330 g THF, purged with nitrogen, and cooled to 0° C. With mixing, 83.9 g of acryloyl chloride is added dropwise. After the addition, the mixture is heated to 40° C. for 2 hours. The mixture is cooled to room temperature and the salt filtered out. The solvent THF is removed by rotary evaporator before use.

11.5 g de-ionized water and 10.8 g of 50% sodium hydroxide solution are added to a 50 ml ampoule. 6.45 g acrylic acid is added slowly into the ampoule. The temperature is kept below 35° C. during the acrylic acid addition with an ice bath. The solution is mixed well until all acrylic acid is dissolved. 2.82 g of the silane monomer N-(3-triethoxysilyl)propylacrylamide is then added. The solution is mixed well until all silane monomer is dissolved. 0.2 g of a 16.75% aqueous solution of azobis(4-cyanovaleric acid) (Wako V-501 available from Wako Chemicals USA, Inc. of Richmond, Va., USA) is added. The monomer solution is sparged with nitrogen for 30 minutes and is subjected to freeze-evacuate-thaw cycle three times and is sealed under vacuum. After the solution is thawed, the ampoule is placed in a 65° C. bath and the polymerization is carried out for 16 hours to yield Reagent Q. The polymer is discharged and dissolved in a caustic (2% sodium hydroxide) solution for performance testing.

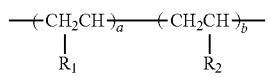

PA-silane-Reagent Q Structure
$R_1 = C(=O)O^-$, $R_2 = C(=O)NHCH_2CH_2CH_2Si(O^-)_3$
$a = 90\%$, $b = 10\%$ As demonstrated by the data presented in Table 10, Reagent Q exhibits significantly increased settling rates and clarity when used in combination with Superfloc HX-400 in a 40/60 DSP/red mud mixture.

TABLE 10

|  | Suspended solids | Reagent | Dosage (ppm) | Settling Rate (m/h) | Clarity (g/l) |
|---|---|---|---|---|---|
| 70 | 40/60 DSP/red mud | Q/HX-400[a] | 50/15 | 5.5 | 1.58 |

TABLE 10-continued

| Suspended solids | Reagent | Dosage (ppm) | Settling Rate (m/h) | Clarity (g/l) |
|---|---|---|---|---|
| 71 40/60 DSP/ red mud | HX-400[a] | 15 | Too Cloudy | 8.02 |

[a]Superfloc HX-400 flocculant

Example 13

Reagent R 29.7 g of 45% potassium hydroxide solution and 2.49 g of de-ionized water are added into a reactor. 15.68 g of acrylic acid is then added slowly into the reactor with stirring. The temperature is kept below 35° C. during acrylic acid addition with an ice bath. 2.55 g of the silane monomer N-(3-triethoxysilyl)propylacrylamide, prepared in Example 12, is then added. The solution is mixed well until all silane monomer is dissolved. The monomer solution is sparged with nitrogen for 30 minutes and is cooled to 0° C. 0.99 g of a 1% aqueous solution of Wako V-501 is added and the nitrogen purge is continued for 15 minutes. 0.08 g of a 0.5% aqueous solution of ammonium persulfate is charged, followed by 0.08 g of 0.5% aqueous solution of hydroxymethanesulfinic acid (monosodium salt dihydrate) and the solution is well mixed. After 30 minutes the reactor is placed in a 75° C. bath and the polymerization is carried out for 5 hours at 75° C. to yield Reagent R. The product is dissolved in a caustic (2% sodium hydroxide) solution for performance testing.

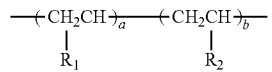

PA-silane-Reagent R Structure
$R_1 = C(=O)O^-$, $R_2 = C(=O)NHCH_2CH_2CH_2Si(O^-)_3$
$a = 96\%$, $b = 4\%$ As demonstrated by the data presented in Table 11, Reagent R exhibits significantly increased settling rates and clarity when used in combination with Superfloc HX-400 in a 30/70 DSP/red mud mixture.

TABLE 11

| Suspended solids | Reagent | Dosage (ppm) | Settling Rate (m/h) | Clarity (g/l) |
|---|---|---|---|---|
| 72 30/70 DSP/ red mud | R/HX-400[a] | 25/15 | 12.7 | 1.61 |
| 73 30/70 DSP/ red mud | HX-400[a] | 15 | Too Cloudy | 6.01 |

[a]Superfloc HX-400 flocculant

Example 14

Reagent R is subjected to further testing, yielding the data presented in Table 12. Reagent R at a dosage of 50 ppm exhibits a settling rate similar to Superfloc HX-400 at 10 ppm, but superior clarity. When used in combination with Superfloc HX-400 at a dosage of 10 ppm in a 30/70 DSP/red mud mixture, Reagent R at a dosage of 15 ppm significantly increases settling rates and clarity over those for Superfloc HX-400 alone.

TABLE 12

(19789-50)

| Suspended solids | Reagent | Dosage (ppm) | Settling Rate (m/h) | Clarity (g/l) |
|---|---|---|---|---|
| 74 30/70 DSP/ red mud | HX-400[a] | 10 | 13.5 | 2.34 |
| 75 30/70 DSP/ red mud | R | 50 | 13.5 | 1.21 |
| 76 30/70 DSP/ red mud | R/HX-400[a] | 15/10 | 16.6 | 0.6 |

[a]Superfloc HX-400 flocculant

Example 15

Reagent S

The polymer backbone poly(acrylamide-co-N-vinylformamide-co-acrylic acid) is synthesized by inverse emulsion polymerization process as described below. The oil phase contained 188.91 g of dearomatized hydrocarbon fluid (Exxsol D-80 oil available from Exxon Mobil Chemical Company, Houston, Tex., USA), 24 g sorbitan monooleate (Arlacel 80AC from Ruger Chemical Co., Linden, N.J., USA), and 9.17 g C12-14 alcohol ethoxylate nonionic surfactant (SURFONIC L24-7 from Huntsman Petrochemical Corporation of Houston, Tex., USA). The aqueous phase consisted of 428.88 g of 54.2% acrylamide aqueous solution, 19.87 g N-vinylformamide, 7.86 g acrylic acid, 112.33 g de-ionized water, 6.57 g of 28% ammonium hydroxide, 0.26 g isopropyl alcohol, and 0.94 g of 40% pentasodium diethylenetriaminepentaacetate (Versenex-80 from The Dow Chemical Company, Midland, Mich., USA). The aqueous solution is mixed into the oil phase and the mixture is homogenized to afford an inverse emulsion. 1.22 g of 2% t-butylhydroperoxide 70% (t-BHP-70) is added into the emulsion while purging the emulsion with nitrogen. After nitrogen purge for 45 minutes sulfur dioxide gas (0.2% in nitrogen) is charged through the nitrogen line to initiate the polymerization. The polymerization is carried out between 40° to 45° C. for 4 hours. The emulsion product contains 32.5% polymer.

The hydroxylamine solution to be charged to the emulsion is prepared as described below. 12.68 g of hydroxylamine sulfate and 71.5 g de-ionized water are charged to a container and stirred until all sulfate is dissolved. 9.78 g of anhydrous sodium thiosulfate is added and the solution is again stirred until all thiosulfate is dissolved. Under agitation 48.34 g of 50% sodium hydroxide solution is then added dropwise to produce the hydroxylamine solution. The solution temperature is kept below 30° C. during the addition of sodium hydroxide.

Into the reactor 96.86 g of the backbone emulsion prepared above is charged. Under agitation and nitrogen blanket, 53.3 g of Exxsol D-80 is added, followed by 3.4 g of Lumulse PEO2 (oleylamine/ethylene oxide reaction product commercially available from Lambent Technologies of Gurnee, Ill., USA). The emulsion is then stirred for at least 15 minutes and then the hydroxylamine solution prepared above is charged over 5 minutes. The emulsion is stirred at room temperature for 24 hours and the temperature is raised to 45° C. and is kept at 45° C. for one hour. The temperature is then lowered to 35° C. and 8.0 g of (3-glycidyloxypropyl)trimethoxysilane is added over two minutes. The reaction is kept at 35° C. for 4 hours and is cooled to room temperature before discharge. The aqueous solution of the product is prepared by breaking the white emulsion into a 2% sodium hydroxide solution containing nonylphenol ethoxylate nonionic surfactant (SURFONIC N-95 from Huntsman Petrochemical Corporation of Houston, Tex., USA), yielding Reagent S.

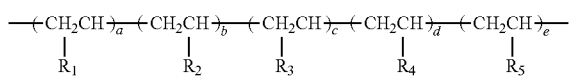

HX-silane-Reagent S Structure $R_1 = C(=O)NH_2$, $R_2 = C(=O)O^-$, $R_3 = C(=O)NHO^-$,
$R_4 = NHCH_2CHOHCH_2OCH_2CH_2CH_2Si(O^-)_3$, $R_5 = NH_2$ $a + b = 82.1\%$, $c = 10.4\%$, $d + e = 7.5\%$ Example 16

Reagent T

A polymer backbone emulsion of poly(acrylamide-co-acrylic acid) is prepared in a similar process as described in Example 15, except that N-vinylformamide is not included in the aqueous phase. The emulsion product contains 32% real polymer.

The hydroxylamine solution to be charged to the emulsion is prepared as follows. 9.17 g of hydroxylamine sulfate and 35 g de-ionized water are charged to a container and stirred until all sulfate is dissolved. 0.88 g of anhydrous sodium thiosulfate is added and the solution is again stirred until all thiosulfate is dissolved. Under agitation, 17.25 g of 50% sodium hydroxide solution is then added dropwise to produce the hydroxylamine solution. The solution temperature is kept below 30° C. during the addition of sodium hydroxide.

98.26 g of the polymer backbone emulsion is charged into the reactor. Under agitation and nitrogen blanket 51.89 g of Exxsol D-80 is added, followed by 3.4 g of Lumulse PEO2. The emulsion is then cooled to 0° C. The emulsion is stirred at 500 rpm while 10.62 g of 50% sodium hydroxide is added, followed by 20.48 g of sodium hypochlorite (11.5% available chlorine) solution. The stirring rate is reduced to 300 rpm after 5 minutes and the emulsion is stirred for an hour. The stirring rate is then increased to 500 rpm and 2.12 g of 50% sodium hydroxide, followed by 4.1 g of sodium hypochlorite (11.5% available chlorine), are charged. Two hours later 7.42 g of 3-aminopropyltriethoxysilane is added. The reaction is carried out for 4 hours at 0° C., 10 hours at room temperature, and 4 hours at 40° C. When the reaction mixture is cooled to room temperature, the hydroxylamine solution is charged over 5 minutes. The emulsion is stirred at room temperature for an hour and the product is discharged. The aqueous solution of the product is prepared by breaking the white emulsion into a 2% sodium hydroxide solution containing SURFONIC N-95, yielding Reagent T.

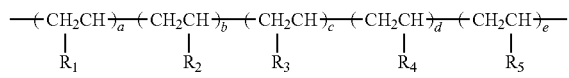

HX-silane-Reagent T Structure $R_1 = C(=O)NH_2$, $R_2 = C(=O)O^-$, $R_3 = C(=O)NHO^-$,
$R_4 = NHC(=O)NHCH_2CH_2CH_2Si(O^-)_3$, $R_5 = NH_2$ $a + b = 67.5\%$, $c = 25\%$, $d + e = 7.5\%$ As demonstrated by the data presented in Table 13, Reagent Q, S, and T each significantly improve settling rate and clarity when used in combination with Superfloc HX in a 40/60 DSP/red mud mixture.

TABLE 13

| Suspended solids | Reagent | Dosage (ppm) | Settling Rate (m/h) | Clarity (g/l) |
|---|---|---|---|---|
| 77 | 40/60 DSP/red mud | HX-400[a] | 10 | 5.1 | 6.32 |
| 78 | 40/60 DSP/red mud | S | 10 | 7.7 | 2.04 |
| 79 | 40/60 DSP/red mud | T | 10 | 3.4 | 3.92 |
| 80 | 40/60 DSP/red mud | Q | 10 | 9.4 | 0.98 |
| 81 | 40/60 DSP/red mud | S/HX-400[a] | 10/10 | 9.4 | 1.82 |
| 82 | 40/60 DSP/red mud | T/HX-400[a] | 10/10 | 8.3 | 1.87 |
| 83 | 40/60 DSP/red mud | Q/HX-400[a] | 10/10 | 14.4 | 0.62 |

[a]Superfloc HX-400 flocculant

Example 17

Reagent U

The polymer backbone emulsion poly(acrylamide-co-N-vinylformamide-co-acrylic acid) synthesized in Example 15 is used in this example. The hydroxylamine solution to be charged to the emulsion is described as follows. 10.77 g of hydroxylamine sulfate and 85.0 g de-ionized water are charged to a container and stirred until all sulfate is dissolved. Under agitation 57.47 g of 50% sodium hydroxide solution is then added dropwise to produce the hydroxylamine solution. The solution temperature is kept below 30° C. during the addition of sodium hydroxide. In this example, the hydroxylamine solution did not contain sodium thiosulfate.

115.16 g of the backbone emulsion is charged into the reactor. Under agitation and nitrogen blanket 63.37 g of Exxsol D-80 is added, followed by 4.04 g of Lumulse PEO2. The emulsion is stirred for at least 15 minutes. The hydroxylamine solution is then added over 5 minutes. The emulsion is stirred at room temperature for 16 hours and then at 55° C. for two hours. The temperature is then lowered to 12° C. and 9.51 g of (3-glycidyloxypropyl)trimethoxysilane is added over two minutes. The reaction is kept at 40° C. for 1 hour and then is cooled to room temperature. 8.31 g of anhydrous sodium thiosulfate is added and the emulsion is stirred for one hour and is discharged. The aqueous solution of the product is prepared by breaking the white emulsion into a 2% sodium hydroxide solution containing SURFONIC N-95, yielding Reagent U.

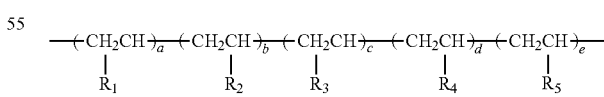

HX-silane-Reagent U Structure $R_1 = C(=O)NH_2$, $R_2 = C(=O)O^-$, $R_3 = C(=O)NHO^-$,
$R_4 = NHCH_2CHOHCH_2OCH_2CH_2CH_2Si(O^-)_3$, $R_5 = NH_2$ $a + b = 81.8\%$, $c = 10.7\%$, $d + e = 7.5\%$ As demonstrated by the data presented in Table 14, Reagent U exhibits good settling rates and clarity in a 40/60 DSP/red mud mixture.

TABLE 14

| | Suspended solids | Reagent | Dosage (ppm) | Settling Rate (m/h) | Clarity (g/l) |
|---|---|---|---|---|---|
| 84 | 40/60 DSP/ red mud | U | 5 | 13.5 | 0.58 |
| 85 | 40/60 DSP/ red mud | HX-400[a] | 5 | 24.0 | 0.64 |

[a]Superfloc HX-400 flocculant

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method for flocculating and reducing a concentration of desilication product suspended in a Bayer process stream, the method comprising:
    intermixing a flocculant composition with a Bayer process stream, the intermixing occurring at a portion of the Bayer process stream selected from the group consisting of a settler feed, a settler overflow, a blow-off discharge and a combination thereof;
    flocculating a desilication product suspended in the Bayer process stream with the flocculant composition; and
    separating at least a portion of the flocculated desilication product thus formed, thereby reducing the concentration of desilication product suspended in the Bayer process stream,
    wherein the flocculant composition comprises a silicon-containing polymer flocculant having at least about 5 weight % silicon-containing groups and a hydroxamated anionic polymer flocculant,
    wherein the flocculant composition provides improved settling rate and clarity when compared to either the silicon-containing polymer flocculant alone or the hydroxamated anionic polymer flocculant alone.

2. The method of claim 1, wherein the silicon-containing polymer flocculant comprises a plurality of —Si(OR)$_3$ groups, wherein R is independently selected from the group consisting of hydrogen, $C_{1-20}$ alkyl, $C_{2-20}$ alkenyl, $C_{6-12}$ aryl, $C_{7-20}$ aralkyl, a group I metal ion, a group II metal ion, and $NR'_4{}^+$; wherein R' is independently selected from the group consisting of hydrogen, $C_{1-20}$ alkyl, $C_{2-20}$ alkenyl, $C_{6-12}$ aryl, and $C_{7-20}$ aralkyl; and wherein R and R' are independently unsubstituted, hydroxy-substituted, or beta hydroxy substituted.

3. The method of claim 2, wherein R is selected from the group consisting of $Na^+$, $K^+$, and $NH_4{}^+$.

4. The method of claim 1, wherein the silicon-containing polymer flocculant is selected from the group consisting of a silicon-containing polyethyleneimine, a copolymer of acrylic acid and triethoxysilylpropylacrylamide, a copolymer of acrylic acid and triethoxyvinylsilane, a silicon-containing polysaccharide, a silicon-containing styrene/maleic anhydride copolymer, a silicon-containing maleic anhydride/alkyl vinyl ether copolymer, and mixtures thereof.

5. The method of claim 1, wherein the silicon-containing polymer flocculant is hydroxamated.

6. The method of claim 1, wherein the flocculant composition is added to the Bayer process stream in an amount in the range of from about 0.1 part per million to about 500 parts per million.

7. The method of claim 1, wherein the Bayer process stream further comprises a suspended red mud.

8. The method of claim 7, further comprising flocculating at least a portion of the suspended red mud.

9. The method of claim 1, wherein the hydroxamated anionic polymer flocculant comprises a hydroxamated polyacrylamide.

10. The method of claim 1, wherein a weight ratio of the amount of the silicon-containing polymer flocculant to the amount of the hydroxamated anionic polymer flocculant in the flocculant composition is in the range of about 100:1 to about 1:10.

11. The method of claim 1, wherein the hydroxamated anionic polymer flocculant has a weight average molecular weight of about 100,000 or greater.

12. The method of claim 1, wherein the hydroxamated anionic polymer flocculant has a weight average molecular weight of about 1,000,000 or greater.

13. The method of claim 1, wherein the hydroxamated anionic polymer flocculant has a weight average molecular weight of from about 5,000,000 to about 30,000,000.

14. The method of claim 1, wherein the hydroxamated anionic polymer flocculant comprises at least about 50% anionic recurring units.

* * * * *